United States Patent [19]

Petronini et al.

[11] Patent Number: 5,458,895
[45] Date of Patent: Oct. 17, 1995

[54] PROCESS AND DEVICE FOR SEPARATING LIQUID FROM CUBED FOOD PRODUCTS

[75] Inventors: Maurizio Petronini, Parma; Luigi Vignoli, Tortiano di Montechiarugolo, both of Italy

[73] Assignee: Manzini Comaco S.p.A., Parma, Italy

[21] Appl. No.: 306,263

[22] Filed: Sep. 14, 1994

[30] Foreign Application Priority Data

Sep. 23, 1993 [IT] Italy ................................. PR93A0036

[51] Int. Cl.⁶ ................................ A23L 1/00; A23N 1/00
[52] U.S. Cl. .............................. 426/231; 99/489; 99/495; 426/489
[58] Field of Search .................................. 426/231, 489; 99/486, 489, 495

[56] References Cited

U.S. PATENT DOCUMENTS 4,335,145  6/1982  Stanley ................................... 426/489
5,320,031  6/1994  Whitney ................................... 99/495

*Primary Examiner*—George Yeung
*Attorney, Agent, or Firm*—Darby & Darby

[57] ABSTRACT

The invention relates to the field of pasteurization of cubed food products, such as fruit or tomato, and in particular discloses a process and device for controlling flow rate of a drainage phase of liquid separating from food chunks, which phase takes place after pasteurization and before storing of the product in sterile bags. A sterile gas such as nitrogen is introduced into a tank containing liquid removed from the food cubes, and a ratio of difference in pressure between the gas and a pressure in a discharge conduit for the food product is continually controlled. When changes in ratio between the pressure differences occur, gas is introduced into the tank or discharged therefrom, as appropriate.

5 Claims, 1 Drawing Sheet

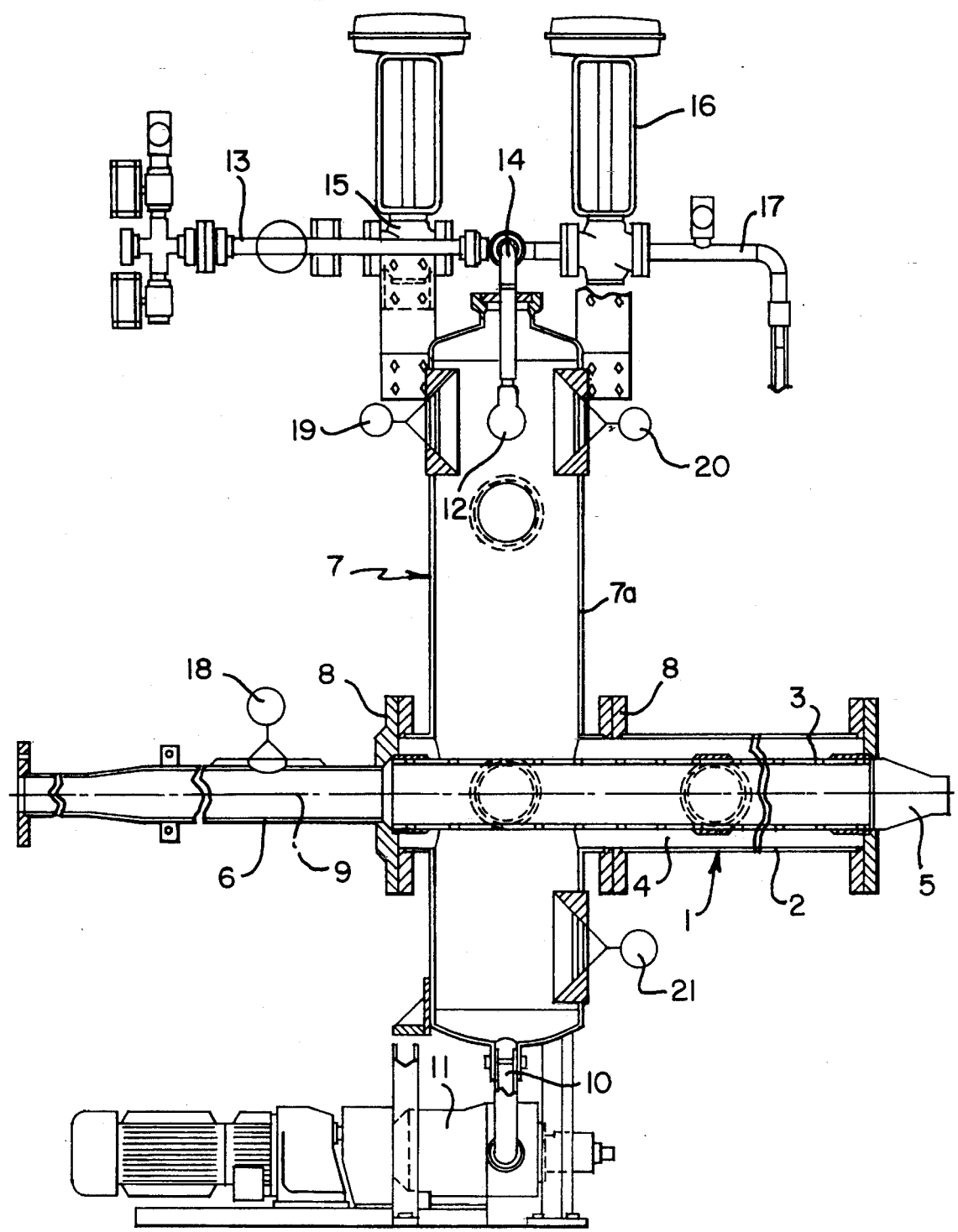

1

PROCESS AND DEVICE FOR SEPARATING LIQUID FROM CUBED FOOD PRODUCTS

BACKGROUND OF THE INVENTION

The food conservation industry includes the production of worked or semiworked food pieces, consisting in pieces of food of desired dimensions, generally called chunks. This production is very commonly used in all fruit processing as well as tomatoes.

After cubing the food proceeds to sterilization and thereafter to storage, undergoing the latter two processes mixed with a liquid, consisting of the juice of the product itself produced during cubing, together with other sterile liquids.

This liquid mixture enables transport of the chunks to be effected without having to resort to using high-pressures which might damage them, and furthermore guarantees sterility during transport along a sterilization plant where the product is subjected to heating and cooling phases before being stored in bags or barrels by means of filling machines, also operating under conditions of absolute sterility.

Before the filling operation can begin, however, the chunks have to be separated from the liquid mixture, and this is performed using drainage devices essentially comprising two concentric cylinders.

The internal cylinder is generally provided with spaced bars forming a grill. The chunks and liquid are introduced therein and the liquid drains down into the external cylinder, whereupon it is removed by an extraction pump, while the chunks are removed from the internal cylinder by a pump which also regulates the outflow rate thereof.

With known-type drainage devices it is difficult to obtain a regular drainage rate which keeps a very low and constant quantity of residual liquid while maintaining a constant outflow rate of the drained chunks.

Constant drainage regulation depends principally on the difference in pressure existing in the outflow conduit for the chunks and in the liquid collection cylinder. This pressure difference can vary for various reasons, such as a partially blocked grill, or to an increase or decrease in the chunk-liquid ratio.

Up to now, in order to keep the pressure as constant as possible, it has only been possible to act directly on the two pumps, which creates obvious difficulties in regulation as well as unpredictable response to such regulation.

BRIEF SUMMARY OF THE INVENTION

The main aim of the present invention is to obviate the above-described drawbacks, and in particular to render the above-mentioned pressure differences constant by means of extremely rapid and precise regulation governing drainage rate.

The aim is achieved by the process and device of the present invention, wherein a sterile inert gas is introduced into a sealed chamber in communication with the liquid collection chamber: the introduction of the gas and thus the pressure exerted on the liquid thereby can be regulated in accordance with variations in the pressure difference which emerge during drainage.

BRIEF DESCRIPTION OF THE DRAWINGS

Further characteristics and advantages of the present invention will better emerge from the detailed description that follows, of an embodiment of the invention, illustrated in the form of a non-limiting example in the accompanying drawing, in which:

the FIGURE is a vertical elevation showing the control device applied to a drainage device.

DESCRIPTION OF THE PREFERRED EMBODIMENT

With reference to the FIGURE, the drainage device 1 is provided with an external cylinder 2 surrounding an inner cylinder 3 exhibiting spaced bars forming a longitudinally-slitted grill.

The two cylinders are coaxial, and between them a chamber 4 is created, into which the liquid flows when introduced together with the chunks into the cylinder 3 through an inlet conduit 5.

The end of the cylinder 3 nearer to an outlet conduit 6 of the separated chunks is provided with a tank 7 connected by flanges 8 to the external cylinder 2.

The vertically-developing tank 7 has an upper portion 7a and a lower portion 7b in relation to a horizontal axis 9 of the drainage device.

At the bottom of the lower portion 7b a discharge conduit 10 of the liquid mixture is located, connected to an extraction pump 11.

A diffusor 12 connected to a conduit 14 fed by a sterile gas line 13 (which may be nitrogen) is located in the upper portion 7a of the tank 7. A solenoid valve 15 is inserted in the line 13 to control gas flow, while a further solenoid valve 16 is located in a discharge conduit 17 connected to the conduit 14.

The control device is further provided with a pressure gauge 18 in the outlet conduit 6 of the chunks and a further pressure gauge 19 situated in the upper portion 7a of the tank 7.

The liquid in the tank 7 rises up to a predetermined level, which thereafter must remain constant during the drainage phase. Two pressure indicators 20 and 21 for controlling the level are provided, both of which send a signal to a microprocessor which then computes the difference between the two signals and compares the result with a predetermined set value. If the two compared values are the same, ideal drainage conditions have been reached, while if a difference emerges from the comparison, the processor sends a signal commanding the opening of one of the two solenoid valves to bring the difference between the signals to the prefixed value, as will be better explained in the following description of the drainage regularity control process hereinbelow.

The above-mentioned process consists in introducing an inert gas such as nitrogen into a chamber or tank containing liquid up to a certain level and in communication with a liquid collection chamber of a drainage device. At the same time, during the whole working process, the pressure inside said chamber containing nitrogen is measured, as well as the pressure in the discharge zone of the chunks. The difference in the above-mentioned pressures is compared with a predetermined set value.

If the comparison results in a positive value nitrogen will be discharged into the outside atmosphere, while if the value is negative nitrogen will instead be introduced into the tank such as to bring the pressure difference into line with the predetermined set value. Variations in the pressure difference will thus be rapidly cancelled out by means of a fast and precise control.

What is claimed:

1. A process for controlling drainage rate in a drainage device for separating liquid from a cubed food product, said drainage device comprising:

two concentric cylinders whereof an internal cylinder is formed by spaced bars constituting a grill wherethrough the liquid falls and separates from the cubes;

a chamber formed between the two cylinders for collecting the liquid;

said internal cylinder being connected with an inlet conduit for a cube/liquid mixture to be separated and with an outlet conduit for the cubes after a separation has taken place, wherein the process comprises the following steps:

introducing a sterile gas into a tank communicating with the chamber collecting the liquid, which tank collects liquid up to a predetermined level in the tank;

measuring the pressure of the sterile gas in the tank;

measuring the pressure in the outlet conduit for the cubes after separation thereof from the liquid;

calculating a difference between the pressure of the sterile gas in the tank and the pressure in the outlet conduit, and a comparison of a result of the calculation with a predetermined set value;

introducing or discharging the sterile gas into or out of the tank whenever said calculation of a difference results in a value which is not null or not within an acceptable range of values.

2. A process as in claim 1, wherein in the first step of introduction of a sterile gas, nitrogen gas is introduced.

3. A device for controlling drainage rate in a drainage device for separation of a liquid from a cubed food product, said drainage device comprises:

two concentric cylinders whereof an internal cylinder is formed by spaced bars constituting a grill wherethrough the liquid falls and separates from the cubes; said liquid being collected in a chamber formed between the two cylinders, said internal cylinder being connected with an inlet conduit for a cube/liquid mixture to be separated as well as with an outlet conduit for the cubes after a separation has taken place, wherein the drainage device further comprises:

a tank connected with the chamber for collecting the liquid and also with an inlet conduit for introducing an inert gas;

a first pressure sensor for measuring a pressure of the inert gas present in the tank;

a second pressure sensor, placed on the outlet conduit of the cubes after the separation thereof from the liquid, for measuring a pressure in the outlet conduit;

a data processor for computing a difference between pressures measured by the first and second pressure sensors, and for comparing such difference to a preset acceptable range of values;

two solenoid valves inserted respectively directly in the inlet conduit and in an off-branch of the inlet conduit for introducing inert gas, and being commanded by the data processor to allow introduction of inert gas into the tank and to discharge inert gas therefrom.

4. A device as in claim 3, wherein the tank is a vertical tank and is directly flanged to the external cylinder, said tank comprising an upper portion located superiorly of a horizontal axis of the drainage device;

the inert gas being introduced into the upper portion.

5. A device as in claim 3, wherein the tank is provided with a level indicator placed in the upper portion of the tank and a further level indicator placed in a lower portion thereof.

* * * * *

UNITED STATES PATENT AND TRADEMARK OFFICE
CERTIFICATE OF CORRECTION

PATENT NO. : 5,458,895
DATED      : October 17, 1995
INVENTOR(S): Maurizio PETRONINI and Luigi VIGNOLI It is certified that error appears in the above-indentified patent and that said Letters Patent is hereby corrected as shown below:

On title page, [30], Foreign Application Priority Data, change "PR93A0036" to --PR93A000036--

Signed and Sealed this

Twenty-seventh Day of February, 1996

Attest:

BRUCE LEHMAN

*Attesting Officer*          *Commissioner of Patents and Trademarks*